Aug. 11, 1936.  C. P. EISENHAUER  2,050,966
WATER SOFTENER
Filed Feb. 14, 1931  2 Sheets-Sheet 1

Inventor
Charles P. Eisenhauer,
By Fassett and Fassett
Attorneys.

Aug. 11, 1936.  C. P. EISENHAUER  2,050,966
WATER SOFTENER
Filed Feb. 14, 1931  2 Sheets-Sheet 2

Inventor
Charles P. Eisenhauer,
By Fassett and Fassett,
Attorneys.

Patented Aug. 11, 1936

2,050,966

UNITED STATES PATENT OFFICE 2,050,966

WATER SOFTENER

Charles P. Eisenhauer, Dayton, Ohio, assignor to The Duro Company, Dayton, Ohio, a corporation of Ohio Application February 14, 1931, Serial No. 515,811

25 Claims. (Cl. 210—24)

This invention relates to apparatus for treating water, more particularly treating hard water to make it soft.

Apparatus for this purpose is well known and commonly includes a tank containing a bed of small grains of zeolites, and a reservoir containing brine and undissolved salt. Upon water passing through the bed of zeolites the lime and magnesia—the constitutents that make water hard—are absorbed by the zeolites, leaving the water soft. After the zeolites have become ineffective through use they can be regenerated by passing a salt solution—brine—through the bed of zeolites, after which water can again be softened by passing it through the bed. All of this is well known and understood in the art and need not be further explained here.

The tank is provided with an inlet for water from a source of supply, and an outlet for treated (soft) water, and the apparatus includes mechanism for regenerating the softening material (zeolites) from time to time according to how much water is softened therein.

There are three principal types of water softeners, namely, manually controlled, semi-automatic, and automatic. As each of these types is well known it is unnecessary to refer particularly to any but that to which the present apparatus belongs, which is the automatic. In the automatic softener the water that is softened is measured with some form of measuring or metering device and when a predetermined amount of water has passed through the meter the apparatus is automatically changed from the condition in which water is softened to the condition in which the softening material is regenerated. After the process of regeneration is completed the bed of softening material is rinsed or flushed with fresh water to remove the brine. This change from regenerating to rinsing the material is automatic, and when the rinsing is finished the apparatus is automatically restored to the condition for softening water, in which condition it remains until, after the said predetermined amount of water has passed through the meter, regeneration is again initiated.

As the apparatus is disabled for softening water during the time the softening material is being regenerated and flushed, it is desirable to complete these operations as quickly as possible. One of the objects of my invention is to reduce by about one-half the time required in flushing the softening material, a saving in time of about twenty minutes. Another object is to provide for utilizing practically the entire capacity of the reservoir for storage of salt. By my improvement I am enabled to store from 30% to 40% more salt in a reservoir of a given size than can be stored in the reservoir of any other softener now on the market.

Another object of my invention is to avoid wasting brine when the supply of salt in the reservoir is replenished. In other water softeners about 10% of the salt is wasted, while in mine none is wasted. Another object is to eliminate delicate parts that are liable to be injured, even where reasonable care is used; for example, when the supply of salt is renewed.

Another object of my invention is to enable a single brine reservoir to serve two or more water softening tanks. This is an important feature in view of the rapidly growing use of water softeners in groups. Where softeners are used in groups and provision is made for putting them through their regeneration periods singly, there is no time when the building is without a supply of soft water. Obviously, it effects a considerable saving in first cost to install only one brine reservoir to serve a plurality of softeners, instead of having to put in a separate reservoir for each softener.

I shall now describe my invention in detail, with the aid of the accompanying drawings, in which, Fig. 1 is a front elevation of my apparatus;

Fig. 2 is an end elevation, seen from the left hand end of Fig. 1;

Fig. 3 a side elevational view of a toggle mechanism whereby the meter operates the controlling valve;

Figure 6:
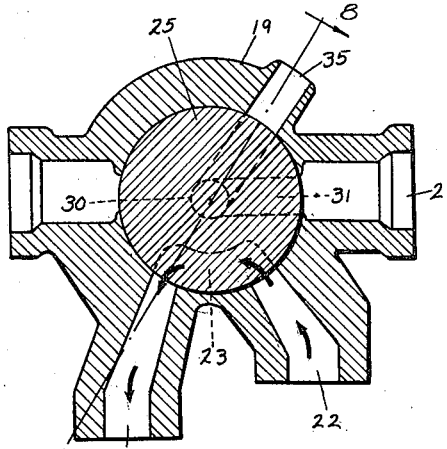
Figure 8:
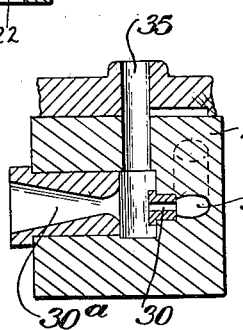

Figure 8 is a fragmental sectional detail of the core 25 of valve 19, taken on line 8—8 of Fig. 6.

Figure 1:
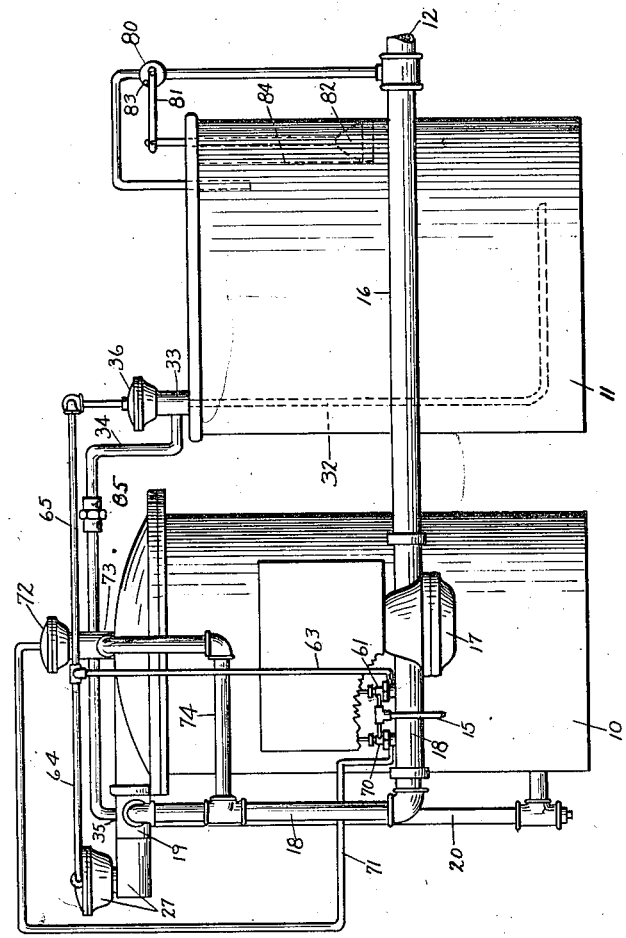
Figure 2:
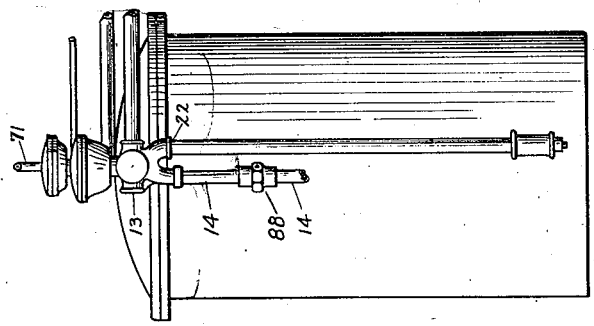

Referring to Figs. 1 and 2, the tank 10 contains the water-softening material, the bed of zeolites, and the reservoir 11 contains brine and undissolved salt. As the particular arrangement of the interior of these vessels, except as hereinafter referred to, forms no part of my invention no further description thereof is necessary at this time. Water to be softened enters the apparatus at 12 and soft water leaves the apparatus at 13. Drain pipes 14 and 15 are connected to the sewer or some other place for the disposal of waste water.

Figure 5:
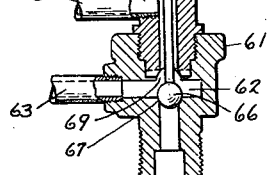
Figs. 5 and 6 are diagrammatic views of certain valves.
Figure 5:
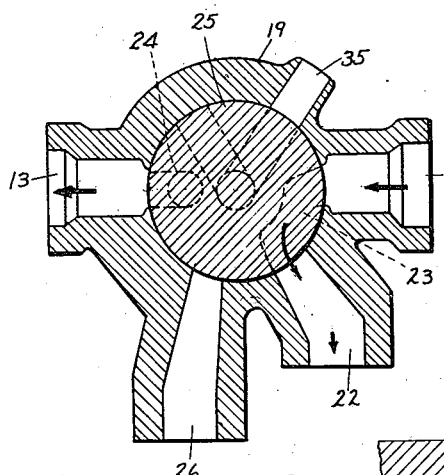

When the apparatus is in normal condition, that is in condition for softening water, water entering the pipe 16 flows through the meter 17, through the pipe 18, a valve 19 and a pipe 20 to the lower part of the tank 10. The water then flows up through the water-softening material in the tank, leaving the upper part of the tank by way of the valve 19, whence it passes to a pipe, not shown, screwed into the outlet 13, and is carried thereby to its destination. The valve 19 is a two-passage valve and Fig. 5 shows diagrammatically the course of water through it when the apparatus is in condition for softening water. Pipe 18 is connected at 21 and pipe 20 is connected at 22, a port 23, shown with dotted lines, connecting these pipes. A port 24, shown with dotted lines, is connected to the upper part of the interior of the tank and with the soft water outlet 13. The drain pipe 14 is connected at 26.

The core 25 of the valve is revoluble clockwise from the position it occupies in Fig. 5 to the position it occupies in Fig. 6, which latter is its position when the water-softening material is being regenerated and flushed. The core is moved counter-clockwise to the position it occupies in Fig. 5 by a spring, and to the position it occupies in Fig. 6 by a flexible diaphragm forming one wall of a hydraulic chamber. This valve-moving mechanism is enclosed in a casing 27, and as such mechanism is common in the art it is not necessary to illustrate or describe it in detail. For example, means for operating such a valve is shown in Fig. 5 of Patent No. 1,634,409, July 5, 1927.

Referring now to Fig. 6, the passage 30 in the center of the core enters the upper part of the tank, and when the apparatus is in regenerating condition water from the meter enters the valve at 21 and flows through the port 31 to the passage 30. The passage 30 includes the Venturi tube of an injector, and suction created by the injector draws brine from the reservoir via a pipe 32 in the reservoir, valve 33, and a pipe 34 connected to the valve 19 at 35. The brine from the reservoir, preferably a concentrated solution, mixes with the water passing through the Venturi tube 30ª and enters the tank as a comparatively weak solution. This solution courses down through the bed of softening material to the bottom of the tank, where it enters the pipe 20. Entering the valve 19 at 22 the solution passes through the port 23, out at 26 to the waste pipe 14 and thence to the sewer. The valve 33 is closed by a spring and remains closed while the apparatus is in water-softening condition. It is opened by a flexible diaphragm forming one wall of a hydraulic chamber, which, together with the spring, are confined in a casing 36. As this valve is of a kind well known in the art it is not necessary to illustrate or describe it in detail. I shall now describe the mechanism for initiating regeneration of the softening-material after a given amount of water has traversed the meter 17.

Figure 3:
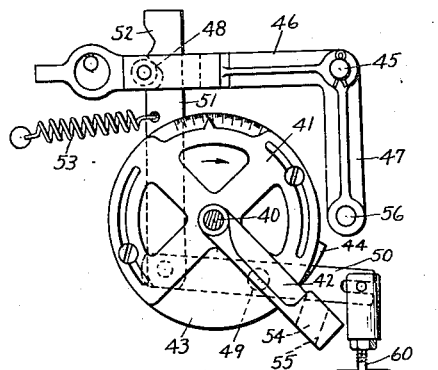
Figure 4:
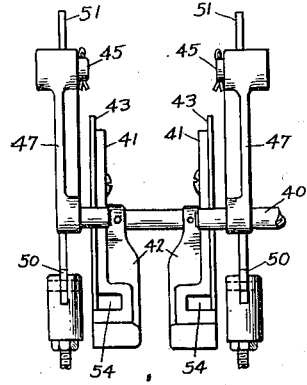
Fig. 4 is a front elevation of two such toggle mechanisms.

A shaft 40 is geared to the meter 17 in such a ratio that the shaft revolves one revolution during a cycle of the water-softening apparatus as whole. Mounted on this shaft are two valve opening devices. As these devices are alike, save that they are right and left hand, respectively, I shall describe only one of them. This device comprises a disc or spider 41 secured to shaft 40, carrying a radially projecting arm 42. Secured to this spider by screws, and therefore adjustable thereon, is a disc 43 having a cam 44 projecting from one point on its periphery. Mounted to rock on a fixed stud 45 is a bell crank lever comprising a horizontal arm 46 and a depending arm 47. At its free end the arm 47 carries a stud 56 which extends into the plane occupied by the disc 43 in a line parallel to the axis of the disc. At its free end the arm 46 has a large hole which encircles a relatively small stationary stud, thereby limiting the movements of the arm, and therefore of the lever as a whole. Intermediate its ends the arm 46 carries a roller 48. Mounted on a stationary stud 49 is a lever 50, approximately horizontal in position. At one end an arm 51, pivotally connected to the lever 50, extends upward past one side of the roller 48. The edge of the arm facing the roller is provided with two notches which convert the intervening portion of the arm's edge into a reclining V-shaped projection 52. A tension spring 53 constantly draws the arm 51 toward the roller 48, and causes the arm to cam the roller up or down according to whether the roller bears against the upper or lower incline of the V. For example, if with the parts in the position they occupy in Fig. 3 the arm 46 were raised until the center of the roller went slightly past the apex of the V, the upper incline of the V, urged to the left by the spring 53, would immediately cam the roller up, thereby snapping the arm up, toggle fashion, to the limit of its play. Moving the arm down far enough to bring the center of the roller slightly below the apex of the V would cause the arm to snap down. At its outer end the arm 42 has a diagonal slot 54, forming a cam 55. As the shaft revolves, clockwise, the cam 55 eventually engages the stud 56 and rocks the lever 46—47 clockwise, lifting the end of the arm and causing the toggle device to snap the arm 46 upward. Presently the cam 44 engages the stud 56, and rocking the bell crank counter-clockwise causes the arm 46 to be snapped downward.

Connected to the free end of the lever 50, by a slot-and-pin connection, is the vertical stem 60 of a controlling valve 61, which valve is screwed into the pipe 18. This valve has a chamber 62 that is connected by a pipe 63, and by pipes 64 and 65, respectively, to the hydraulic chambers of valves 19 and 33. The valve has two seats; when its stem 60 is in its lower position, as when the apparatus is in condition for softening water, the valve member 66 is on the lower seat, 67, and the water is shut off. At such times the chamber 62 is in communication with a port 68 in the valve, into which port the drain pipe 15 is connected, thus allowing the water to escape from the hydraulic chambers of valves 19 and 33, so the springs of the valves can operate them. When the stem is raised by the toggle to its upper position the valve member 66 rests on the upper seat, 69, thereby cutting the chamber 62 off from the drain and admitting water under pressure to the hydraulic chambers of the valves 19 and 33. Valve 19 is then moved to the position it occupies in Fig. 6 and valve 33 is opened.

A second toggle-operated valve, 70, adjacent to the valve 61, taps the pipe 18. The valve 70 is a duplicate of the valve 61, and is operated by a toggle mechanism like that already described. For convenience in referring to these toggle mechanisms hereinafter I shall refer to the one that operates valve 61 as mechanism A, and the one that operates valve 70 as mechanism B. I shall also use the same reference numerals in referring to the parts of valve 70 and mechanism B as have been used in referring to valve 61 and mechanism A.

Connected to the chamber 62 of valve 70 is a pipe 71, which pipe is connected to a hydraulic chamber 72 belonging to a valve 73. This valve is screwed into the top of the tank 10. Like valve 33, the valve 73 is closed by a spring and opened by water acting on a flexible diaphragm that forms one wall of the hydraulic chamber 72. The port 68 is connected to the drain pipe 15, so when the valve 70 is closed the hydraulic chamber 72 is bled by the drain and the spring is enabled to close valve 73. The disc 41 of toggle mechanism B is set on shaft 40 a little behind the disc 41 of mechanism A. By the time enough water has passed through the injector 30a to complete the regenerative operation, the cam 55 of toggle-mechanism B trips said mechanism and opens valve 70. This lets water under pressure into the hydraulic chamber 72 and opens valve 73, allowing water from pipe 16 to flow through pipe 74 and through valve 73 to the tank. The water entering the tank through valve 73 by-passes the passage 30 and Venturi tube 30a, and the water enters the tank in such volumes as to build up a pressure therein sufficient to overcome the injector and force water through the brine pipe 34 into the reservoir, replacing liquid (brine) that has just been drawn therefrom. Water from valve 73 flows down through the softening material and flushes or rinses the material, leaving the tank by way of pipe 20, and finding its way to the sewer via port 23 in valve 19, and pipe 14. For this reason I call the valve 73 the flushing valve.

The disc 43 of mechanism A is so set with reference to the cam 55 of mechanism B that after water has flowed through valve 73 a sufficient time to thoroughly rinse the softening material the cam 44 of mechanism A trips said mechanism A and closes valve 61, which at the same time connects the chamber 62 of the valve to the drain pipe 15. This bleeds the hydraulic chambers of valves 19 and 33 and allows valves 19 and 33 to be operated by their respective springs; the former to move from the position it occupies in Fig. 6 to the position it occupies in Fig. 5, and the latter to close. The disc 43 of mechanism B is so positioned with reference to the disc 43 of mechanism A, that the cam 44 or B trips its toggle and closes the valve 73 immediately after the mechanism A is tripped. If desired both toggle mechanisms might be set to be tripped by their respective cams 44 simultaneously, but to avoid the possibility of B tripping ahead of A it is preferable to have A set to trip slightly ahead of B. The tripping of mechanism B by its cam 44 is the final step in restoring the apparatus to its normal condition.

The volume of water returned to the reservoir 11 is slightly less than the volume of the brine just drawn from the reservoir. This is so that as the supply of undissolved salt in the reservoir is gradually diminished the level of the brine in the reservoir will be reduced in the same proportion. Then when it is necessary to replenish the supply of salt there is sufficient room in the reservoir for the new supply. In water softeners wherein the brine is constantly maintained at the original level by a float-controlled valve, regardless of the amount of salt the reservoir contains, the brine is caused to overflow when a new supply of salt is put in the reservoir, and in this way about 10% of the salt put in the reservoir is wasted. In my apparatus the amount of water returned to the reservoir after each regeneration is sufficiently restricted to insure that no brine will overflow when the salt supply is replenished.

As restricting the refilling of the reservoir, so as not to waste brine, involves rather exact adjustment, I prefer to over-restrict the refilling slightly. In order that this may not result in eventual exhaustion of the brine I provide a small float-controlled valve whereby to prevent the level of the brine falling below a certain point. This valve is shown at 80, in Fig. 1. The valve is operated by the arm 81, from which a float 82 is suspended. When the level of the brine falls too low the arm is moved down slightly by gravity and lets in enough water from the pipe 16 to prevent the supply of brine becoming exhausted. A small pin 83 prevents the arm being lifted too far, regardless of how high the brine may rise in the reservoir. This float is protected by a shield 84, in the form of a tube, in which the float rises and falls without interference, and the whole device takes up so little room that it does not reduce the capacity of the reservoir appreciably.

Figure 7:
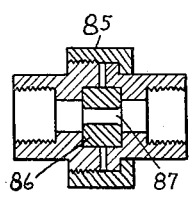
Fig. 7 illustrates a structural detail.

For the purpose of regulating the amount of brine drawn from the reservoir during the regenerating period, so that the salt solution passed though the softening material shall be of the desired strength, I introduce a restricting device of known capacity in the brine pipe 34. This is shown at 85, in Fig. 1, but it is better seen in Fig. 7. This restriction is similar to an ordinary pipe union, but in the center is placed a nozzle 86 having an orifice 87 of considerably less diameter than the diameter of the pipe 34. The orifice is made just the size necessary to permit passage of the amount of brine required in the solution that passes to the tank to regenerate the softening material. This restriction is also used, in connection with a similar restriction, 88, placed in the drain pipe 14, to regulate the amount of water returned to the reservoir to replace brine drawn therefrom. The capacity of the orifice in the nozzle of the restriction 88 is so proportioned to that of the orifice in the restriction 85, that just the required amount of water flows into the reservoir during the time the flushing operation is taking place. But the nozzle 88 is larger than the nozzle 85 and a much larger volume of water flows through the tank than flows to the reservoir. In fact the amount of water flowing through the softening material is as large as can be effectively used and the flushing operation is therefore accomplished in the shortest possible time.

Since the operation of my invention has been fully described as the description of the apparatus has proceeded, only a brief recapitulation is needed. Beginning with the restoration of the apparatus to its normal condition, treated or soft water is delivered at the outlet 13 until sufficient water has passed through the meter to rotate the shaft 40 one revolution. Then the mechanism A is tripped by its cam 55, causing the operation of valve 19 and the opening of the valve 36.

Regeneration of the softening material then proceeds, and as water to carry on the regeneration passes through the meter the shaft 40 rotates slowly, eventually causing the cam 55 of mechanism B to trip valve 70, thereby opening the flushing valve 73. This stops the process of regeneration and begins the flushing process, at the same time beginning to return water to the reservoir. The meter continues to rotate, propelled by the water used for flushing the softening material, and in due time mechanism A is tripped by its cam 43 causing restoration of valve 19 to the position it occupies in Fig. 5, and closing valve 33. Immediately thereafter mechanism B is tripped by its cam 43 and the flushing valve 73 is closed. The apparatus has thus completed a cycle and is again in normal condition, ready to soften water.

I have heretofore stated that in the practice of my invention one reservoir can be made to serve a plurality of softeners. This is because control of the various steps in the cycle of the apparatus is independent of the liquid in the reservoir. In other water softeners control of the steps of the cycle is effected with float mechanism actuated by the brine, and the brine is required to have two or more levels in different stages of a single cycle. For that reason it can control only one softener.

In my present apparatus water flows upward in the tank during softening and downward during regeneration and flushing. This is now recognized as the best practice, but there is nothing inherent in my invention which limits it to that mode of operation.

While I have illustrated and described what I now regard as the preferred embodiment of my invention, I am aware that various structural modifications are possible without departure from the spirit or exceeding the scope of my invention. What I claim as my invention is as follows:

1. In water-softening apparatus, a control valve, a meter to open said valve when a given amount of water has passed therethrough, thereby initiating regeneration of the water-softening material, which regenerating operation uses water that passes through the meter, a flushing valve, means comprising the meter for opening said valve after a given amount of water has traversed the meter for regenerating purposes, means whereby opening the flushing valve stops regeneration and flushes the water-softening material with fresh water that has traversed the meter, and means comprising the meter for restoring the apparatus to water-softening condition after a given amount of water has traversed the meter for flushing purposes.

2. In water-softening apparatus comprising a tank containing water-softening material and a reservoir containing regenerating liquid, a control valve, a meter to open said valve after a given amount of water has passed therethrough, a flushing valve, means comprising the meter for opening said valve after a given amount of water has traversed the meter for regenerating purposes, said flushing valve introducing water to the tank through a more capacious passage than that through which water is supplied to the tank for regenerating purposes, means whereby opening the flushing valve stops the regenerating and flushes the tank and contents with fresh water, and means comprising the meter for restoring the apparatus to water-softening condition after a given amount of flushing water has traversed the meter.

3. In water-softening apparatus comprising a tank containing water-softening material and a reservoir containing brine, a control valve, a meter to open said valve after a given amount of water has passed therethrough, thereby initiating the process of regenerating the softening material with brine drawn from the reservoir and water passed through the meter, a flushing valve, means comprising the meter for opening said flushing valve after a given amount of water has passed through the meter for regenerating purposes, thereby stopping the regeneration process and flushing the tank and contents with fresh water, means whereby during he flushing operation water from the flushing valve is introduced into the reservoir to replace brine just withdrawn therefrom, and means comprising the meter for restoring the apparatus to water-softening condition after a given amount of flushing water has traversed the meter.

4. In water-softening apparatus comprising a tank containing water-softening material and a reservoir containing brine, a control valve, a meter to open said valve after a given amount of water has passed therethrough, thereby initiating the process of regenerating the softening material with brine drawn from the reservoir and water passed through the meter, a flushing valve, means comprising the meter for opening said flushing valve after a given amount of water has passed through the meter for regenerating purposes, thereby stopping the regenerating process and flushing the tank and contents with fresh water, means whereby during the flushing operation water from the flushing valve is introduced into the reservoir, the volume of which is a little less than the volume of the brine just withdrawn therefrom, and means comprising the meter for restoring the apparatus to water-softening condition after a given amount of water has traversed the meter.

5. In water-softening apparatus comprising a tank containing water-softening material and a reservoir containing brine, a control valve, a meter to open said valve after a given amount of water has passed therethrough, thereby initiating the process of regenerating the softening material with brine drawn from the reservoir and water passed through the meter, a flushing valve means comprising the meter for opening said flushing valve after a given amount of water has passed through the meter for regenerating purposes, thereby stopping the regenerating process and flushing the tank and contents with fresh water, means whereby during the flushing operation a volume of water from the flushing valve is introduced into the reservoir substantially equal to the volume of the brine just withdrawn, minus the volume of the quantity of dry salt required to convert the newly introduced water into brine, and means comprising the meter for restoring the apparatus to water-softening condition after a given amount of water has traversed the meter.

6. In water-softening apparatus comprising a tank containing water-softening material and a reservoir containing brine, mechanism comprising an injector for drawing brine from the reservoir and introducing it into said tank diluted with water, whereby to regenerate the water-softening material therein, a control valve means comprising a water meter for opening said valve when a given amount of water has traversed the meter, thereby initiating said regenerating process, a flushing valve, means comprising the meter for opening said flushing valve when a given amount of water has passed therethrough, means whereby opening the flushing valve stops the regenerative action, and means comprising the meter whereby to restore the apparatus to water-softening condition when a given amount of water has traversed the meter.

7. In water-softening apparatus comprising a tank containing water-softening material and a reservoir containing brine, mechanism comprising an injector for drawing brine from the reservoir and introducing it into said tank diluted with water, whereby to regenerate the water-softening material therein, a control valve, means comprising a water meter for opening said valve when a given amount of water has traversed the meter, thereby initiating said regenerating process, a flushing valve whereby to introduce water into the tank to flush its contents, said water by-passing the injector and disabling it, means whereby during the flushing operation water from the flushing valve is introduced into the reservoir in an amount slightly less in volume than the volume of the brine just withdrawn therefrom, and means comprising the meter for closing said flushing and control valves when a given amount of water has passed through the meter.

8. In water-softening apparatus comprising a tank containing water-softening material and a reservoir containing brine, mechanism comprising an injector for drawing brine from the reservoir and introducing it into said tank diluted with water, whereby to regenerate the water-softening material therein, a control valve, means comprising a water meter for opening said valve when a given amount of water has traversed the meter, thereby initiating said regenerating process, a flushing valve whereby to introduce water into the tank to flush its contents, said water by-passing the injector and disabling it, means whereby during the flushing operation water from the flushing valve is introduced into the reservoir in an amount slightly less in volume than the volume of the brine just withdrawn therefrom, and means comprising the meter for restoring the apparatus to water-softening condition after a given amount of water has traversed the meter.

9. In water-softening apparatus comprising a tank containing water-softening material and a reservoir containing brine, mechanism comprising a water meter through which water to be softened passes, means comprising said meter for initiating the process of regenerating the softening material when a given amount of water has passed through the meter, said process using brine from the reservoir and water that passes through the meter, means comprising the meter for stopping the regenerating when a given amount of water has traversed the meter, means including a valve for flushing the tank and its contents with fresh water, and means for diverting water from said valve and causing it to flow into the reservoir during the flushing operation to an amount slightly less than the amount of brine just removed.

10. In water-softening apparatus comprising a tank containing water-softening material and a reservoir containing brine, mechanism comprising a water meter through which water to be softened passes, means comprising said meter for initiating the process of regenerating the softening material when a given amount of water has passed through the meter, said process using brine from the reservoir and water that passes through the meter, said mechanism being independent of the level of the brine in the reservoir, thereby permitting the reservoir to serve a plurality of tanks, means comprising the meter for stopping the regenerating when a given amount of water has traversed the meter for flushing the tank and contents with fresh water, means for causing water to flow into the reservoir during the flushing operation to an amount slightly less than the amount of brine just removed, and means for preventing too great a depletion of the brine in the reservoir by repeated short refilling.

11. In water-softening apparatus comprising a tank containing water-softening material, a reservoir containing brine, a meter through which water passes for rinsing the water-softening material after it has been regenerated with brine drawn from said reservoir, means controlled by said meter for starting said rinsing operation and then stopping it after a given amount of water has passed through the meter, and means controlled by said meter for putting water into the reservoir during said rinsing operation to partially replace the brine withdrawn therefrom.

12. In water-softening apparatus comprising a tank containing water-softening material, a reservoir containing brine, a meter through which water passes for rinsing the water-softening material after it has been regenerated with brine drawn from said reservoir, means controlled by said meter for starting said rinsing operation and then stopping it after a given amount of water has passed through the meter, and means controlled by said meter for putting water into the reservoir during said rinsing operation to an amount substantially equal to the bulk of dry salt contained in the brine withdrawn therefrom.

13. In water-softening apparatus comprising a tank containing water-softening material, a reservoir containing brine, a meter through which water passes for rinsing the water-softening material after it has been regenerated with brine drawn from said reservoir, means comprising said meter for starting said rinsing operation and then stopping it after a given amount of water has passed through the meter, means for putting water into the reservoir during said rinsing operation to partially replace the brine withdrawn therefrom, and a float-controlled valve whereby to prevent the water in the reservoir falling below a given level.

14. In water-softening apparatus comprising a tank containing water-softening material and a reservoir containing brine wherewith to regenerate the water-softening material from time to time, a pipe to supply water for flushing the tank after a period of regeneration, a meter through which said water flows, a valve in said pipe, means comprising said meter for opening the valve to start flushing the tank and for closing the valve to terminate the flushing operation, means for causing brine to flow from the reservoir to the tank, and means for creating pressure in said tank whereby to stop the flow of brine to the tank.

15. In water-softening apparatus comprising a tank containing water-softening material and a reservoir containing brine wherewith to regenerate the water-softening material from time to time, a pipe to supply water for flushing the tank after a period of regeneration, a meter through which said water flows, a valve in said pipe, means comprising said meter for opening the valve to start flushing the tank and for closing the valve to terminate the flushing operation, means for causing brine to flow from the reservoir to the tank, and means for creating pressure in said tank, whereby to stop the flow of brine to the tank and cause a flow of water to the reservoir to replace the brine that has been drawn therefrom.

16. In water-softening apparatus comprising a tank containing water-softening material and a reservoir containing brine wherewith to regenerate the water-softening material, a plurality of valves whereby to change the apparatus from softening to regenerating condition, a control valve which, when opened, operates said plurality of valves as aforesaid, a meter whereby said control valve is opened after a given amount of water has passed through the softening tank, a flushing valve, a second control valve which, when opened, opens said flushing valve, means comprising the meter for opening said second control valve after a given amount of water has traversed the meter since opening the first control valve, and means comprising the meter for closing both control valves and restoring the apparatus to water-softening condition after a given amount of flushing water has traversed the meter.

17. In water-softening apparatus comprising a tank containing water-softening material and a reservoir containing brine wherewith to regenerate the water-softening material, a plurality of valves whereby to change the apparatus from softening to regenerating condition, and start a flow of brine through the softening material, a control valve the opening of which operates said plurality of valves as aforesaid, a meter whereby said control valve is opened after a given amount of water has passed through the softening tank to be softened, a flushing valve, a second control valve, the opening of which opens said flushing valve, means comprising the meter for opening said second control valve after a given amount of brine has passed to the softening tank, means whereby the flow of brine to the softening tank is stopped concurrently with the opening of the flushing valve, and means comprising the meter for closing both control valves and restoring the apparatus to water-softening condition after a given amount of flushing water has passed through the softening tank.

18. In water-softening apparatus a control valve, a meter to open said valve when a given amount of water has passed therethrough, thereby initiating regeneration of the water-softening material, which regeneration operation uses water that passes through the meter, a flushing valve, means comprising said meter for opening said flushing valve after a given amount of water has traversed the meter for regenerating purposes, means whereby opening the flushing valve starts rinsing the material with fresh water and by building up a pressure in the tank stops the regenerating process, and means comprising said meter for restoring the apparatus to its original condition after a given amount of water has traversed said meter for flushing purposes.

19. In a water softening apparatus comprising a tank containing water softening material, a reservoir containing brine and a meter through which water to be softened passes, an injector and means whereby to draw brine from said reservoir therewith and inject it into said tank after a given amount of water has passed through the meter, and means for introducing a flow of water through the tank after the injector has operated a given amount, which flow creates a pressure in the tank whereby to stop the flow of brine to the tank.

20. In water softening apparatus, a tank containing water-softening material and a reservoir containing brine, a control valve, a meter for operating said control valve, a hydraulically operated valve, controlled by said control valve, through which brine is conducted from said reservoir to said tank, a second control valve operated by said meter, a second hydraulically operated valve, controlled by said second control valve, through which flushing water is admitted to the tank after the required amount of brine has been admitted thereto said control valves being independently movable, and means for stopping the flow of brine to the tank when the flow of flushing water thereto begins.

21. In a water-softening apparatus, a tank containing water-softening material and a reservoir containing brine, a control valve, a meter for operating said control valve, a hydraulically operated valve, controlled by said control valve, through which brine is conducted from said reservoir to said tank, an injector for supplying brine to the tank, a second control valve operated by said meter, a second hydraulically operated flushing valve, controlled by said second control valve, through which flushing water is admitted to the tank to flush the water softening material therein after the required amount of brine has been admitted thereto, said flushing valve admitting sufficient water to the tank to create a pressure to prevent the flow of brine into the tank.

22. In a water-softening apparatus, a tank containing water-softening material and a reservoir containing brine, a control valve, a meter for operating said control valve, a power operated valve, controlled by said control valve through which brine is conducted from the reservoir to the tank, a second control valve operated by said meter, a second power operated valve, controlled by said control valve, through which flushing water is admitted to the tank after the required amount of brine has been admitted thereto, said control valves being independently movable, means for stopping the flow of brine to the tank when the flow of flushing water begins, and means for stopping the flow of flushing water thereto later.

23. In a water softening apparatus, a tank containing water softening material, an open brine reservoir, a valve through which brine is conducted from the brine reservoir to the softening tank, a second vave for controlling the admission of flushing water to the softening tank and for controlling the admission of water to the open brine reservoir to refill the same, two pilot valves for controlling the operation of said brine and flushing water valves, and a meter for operating said pilot valves.

24. In a water softening apparatus, a tank containing water softening material, a brine reservoir, a connection between said tank and reservoir for the passage of brine and liquid, a meter, means controlled by said meter for governing the regeneration, flushing and softening operations, means controlled by said meter for replacing the brine removed from said brine reservoir with liquid, and means to limit such replacement liquid to an amount less than the volume of brine removed from said reservoir.

25. In a water softening apparatus, a tank containing water softening material, a reservoir containing brine connected to said softening tank, a brine valve to admit brine from said brine reservoir to said softening tank to regenerate the softening material, a control valve to control the opening and closing of said brine valve, a flushing water valve to admit flushing water to said softening tank to flush the softening material therein to stop regeneration and to refill the brine reservoir, a control valve to control the opening and closing of said flushing water valve, means to open said control valve for the brine valve after a predetermined quantity of water has been softened and to open said control valve for the flushing water valve after the water softening material has been regenerated, and means to close said control valves and the brine and flushing water valves at the completion of the flushing operation.

CHARLES P. EISENHAUER.